United States Patent
Hiramatsu et al.

(10) Patent No.: US 7,123,369 B2
(45) Date of Patent: Oct. 17, 2006

(54) APPARATUS, SYSTEM AND METHOD FOR IMAGE PROCESSING WITH INHIBITION CONTROL

(75) Inventors: Naoko Hiramatsu, Kyoto (JP); Hirotomo Ishii, Toyonaka (JP); Akira Murakawa, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 836 days.

(21) Appl. No.: 09/880,044

(22) Filed: Jun. 14, 2001

(65) Prior Publication Data

US 2003/0095276 A1 May 22, 2003

(30) Foreign Application Priority Data

Jun. 15, 2000 (JP) .............................. 2000-180061

(51) Int. Cl.
*F06K 15/00* (2006.01)
(52) U.S. Cl. ...................................... 358/1.14; 382/181
(58) Field of Classification Search ............... 358/1.14; 382/181, 149; 399/366
See application file for complete search history.

(56) References Cited

U.S. PATENT DOCUMENTS

| 5,621,810 | A | * | 4/1997 | Suzuki et al. ................ 382/135 |
| 5,647,010 | A | * | 7/1997 | Okubo et al. ................ 382/100 |
| 5,652,803 | A | * | 7/1997 | Tachikawa et al. .......... 382/135 |
| 5,659,628 | A | * | 8/1997 | Tachikawa et al. .......... 382/135 |
| 5,917,619 | A | * | 6/1999 | Yamagata et al. ........... 358/501 |
| 6,047,085 | A | * | 4/2000 | Sato et al. ................... 382/165 |
| 6,108,098 | A |   | 8/2000 | Owada et al. |
| 6,222,935 | B1 | * | 4/2001 | Okamoto ..................... 382/149 |
| 6,307,963 | B1 | * | 10/2001 | Nishida et al. ............. 382/190 |
| 6,404,509 | B1 | * | 6/2002 | Kuwata et al. .............. 358/1.9 |
| 6,430,711 | B1 | * | 8/2002 | Sekizawa ...................... 714/47 |
| 6,539,114 | B1 | * | 3/2003 | Shimazawa ................. 382/195 |
| 6,621,922 | B1 | * | 9/2003 | Takaragi et al. ............ 382/162 |
| 6,807,388 | B1 | * | 10/2004 | Kojima et al. ................ 399/80 |
| 2003/0193569 | A1 | * | 10/2003 | Ogawa et al. ........... 348/207.2 |

FOREIGN PATENT DOCUMENTS

| JP | 07-154592 | 6/1995 |
| JP | 10-308870 | 11/1998 |

\* cited by examiner

*Primary Examiner*—Dov Popovici
(74) *Attorney, Agent, or Firm*—Buchanan Ingersoll & Rooney PC

(57) ABSTRACT

In an image processor, a memory device stores output inhibition conditions for inhibiting print of an image including a specified pattern. The input image data is converted to first image data for image forming. On the other hand, the input image data is also converted to second image data in correspondence to a state of a print obtained by the image output device, and a detector detects the specified pattern in the second image data based on the output inhibition conditions. Alternatively, a converter converts the output inhibition conditions to detection parameters according to output characteristics of the image output device, and a detector detects the specified pattern in the input image data based on the detection parameters. Then, a controller controls the output of the processed image data according to a result of the detection.

14 Claims, 6 Drawing Sheets

APPARATUS, SYSTEM AND METHOD FOR IMAGE PROCESSING WITH INHIBITION CONTROL

This application is based on application No. 2000-180061, filed in Japan, the contents of which are hereby incorporated by reference.

BACKGROUND OF THE INVENTION

1. Field of the Invention

The present invention relates to image processing for preventing forgery of paper money, securities and the like.

2. Description of Prior Art

Recently, a peripheral of a computer such as a scanner or a color printer has improved functions and higher performance, and a possibility is increased that an average consumer can copy paper money, securities and the like easily. Then, effective countermeasures for preventing forgery have been developed. One of methods for preventing forgery is to include a specified pattern in a design of paper money or the like. The specified pattern is embedded in an image so as not to be noticed by a user in the standpoint of prevention of forgery. Image data is analyzed before printing, and when the specified pattern is detected in the image data, normal print operation is stopped.

However, in the prior art technique for preventing forgery in image forming, an input device is fixed as an input system, and the detection of a specified pattern is performed on data depending on the input device. Therefore, the technique cannot be applied to a print system or an image forming device to which a plurality of input devices can be connected. That is, even when correct detection is possible on image data received from a particular input device, it may not be so for image data received from another input device having different characteristics. Therefore it is desirable to detect a specified pattern in an output device independent of the input device.

SUMMARY OF THE INVENTION

An object of the present invention is to prevent forgery in an image forming apparatus or system having a plurality of input systems, independently of input system.

In one aspect of the invention, in an image processor processes input image data and sends the processed data to an image output device, a memory device stores output inhibition conditions for inhibiting print of an image including a specified pattern. A first converter converts the input image data to first image data for image forming. On the other hand, a second converter converts the input image data to second image data in correspondence to a state of a print obtained by the image output device, and a detector detects the specified pattern in the second image data based on the output inhibition conditions. A controller controls the output of the first image data according to a result of the detection.

In another aspect of the invention, in an image processor processes input image data and sends the processed data to an image output device, a memory device stores output inhibition conditions for inhibiting print of an image including a specified pattern. A converter converts the output inhibition conditions to detection parameters according to output characteristics of the image output device, and a detector detects the specified pattern in the input image data based on the detection parameters. A controller controls the output of the processed image data according to a result of the detection.

An advantage of the present invention is that an image processor or a system which does not depend on the input system on the prevention of forgery can be constructed.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
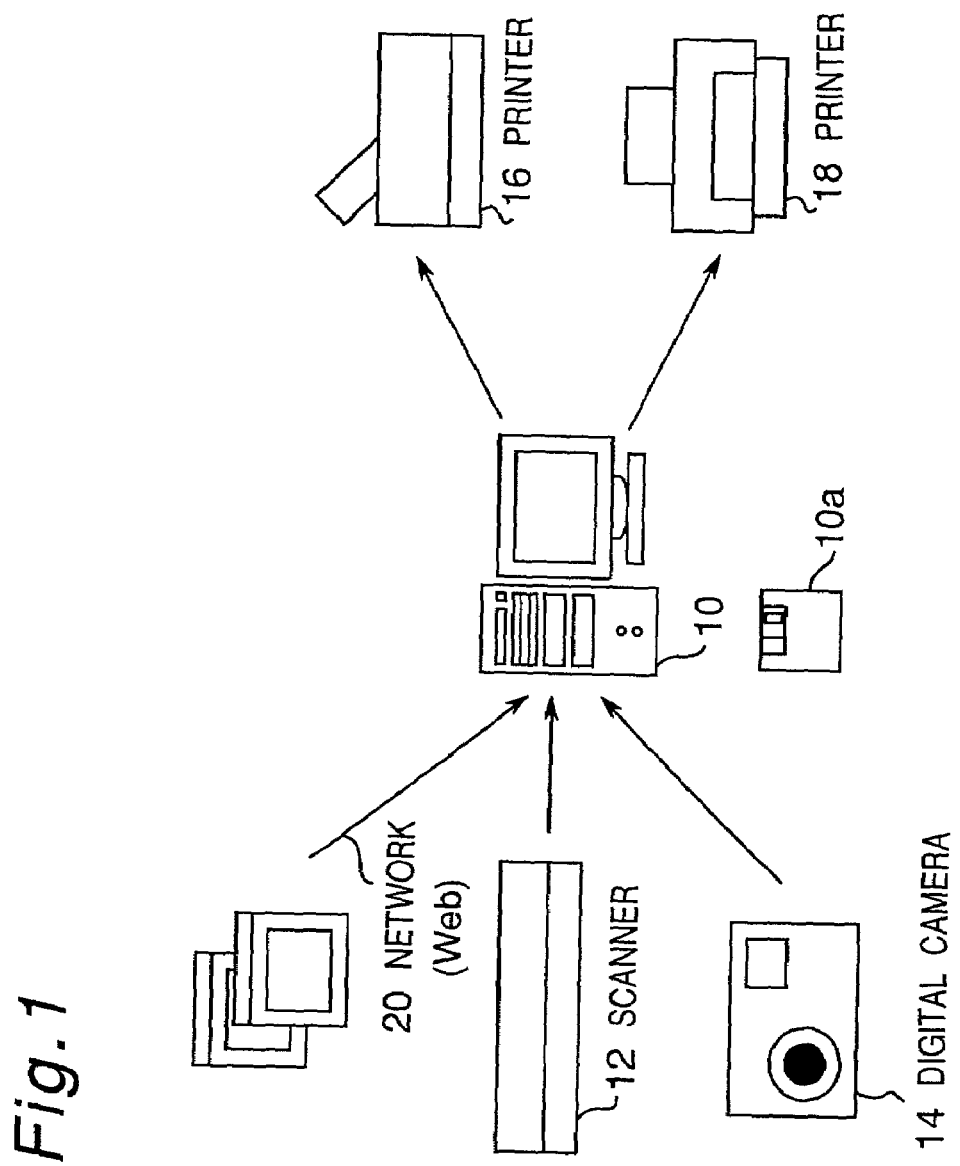
FIG. 1 is a diagram of an image processing system.

Referring now to the drawings, wherein like reference characters designate like or corresponding parts throughout the several views, FIG. 1 shows an image processing system having a plurality of image input devices. In this system, in order to prevent forgery, a specified pattern included in a document image is detected in input image data, and when the specified image or pattern is detected, output of the image data is inhibited. A computer 10 controls the entire system. The computer 10 has a central processing unit (CPU), a read-only memory (ROM) and a random access memory (RAM). Further, it includes a flexible disk drive, a hard disk drive, and a CD-ROM drive for memory media of a flexible disk 10a, a hard disk and a CD-ROM. An image processing program shown in FIGS. 4 to 7 is read from such a recording medium. The computer 10 is connected to a scanner 12 and a digital camera 14 as an image input device. Further, the computer 10 is also connected to a plurality of printers 16 and 18 as an image output device for outputting the image data. When an image is formed, the computer 10 calculates color, size, resolution and the like of a hard copy of the output image, based on the data received from the image input device 12, 14 and output characteristics of the printer 16, 18. Then, the computer 10 detects the specified pattern and decides to permit or inhibit the image formation. Further, the computer 10 can be connected to a different image input device or to a different image output device through a network 20. It is to be noted that "input image" includes not only an image received by the computer 10 from an external image input device, but also an image generated in the computer 10. The above-mentioned system structure is common to other embodiments explained later.

As will be explained below, this system detects a specified pattern in an image with reference to a hard copy. In order to construct a system which does not depend on an input system on the detection of specified pattern, it is needed in this system that input data has a correspondence with a print color for the same printer setting. That is, if input data is the same, the colorimetry values of print color in a hard copy has to be the same generally. Therefore, if a driver or the like corrects an image such as color correction or automatic contrast correction for each area, the specified pattern is detected after removing the correction functions or by using the data after applying the correction functions.

Figure 2:
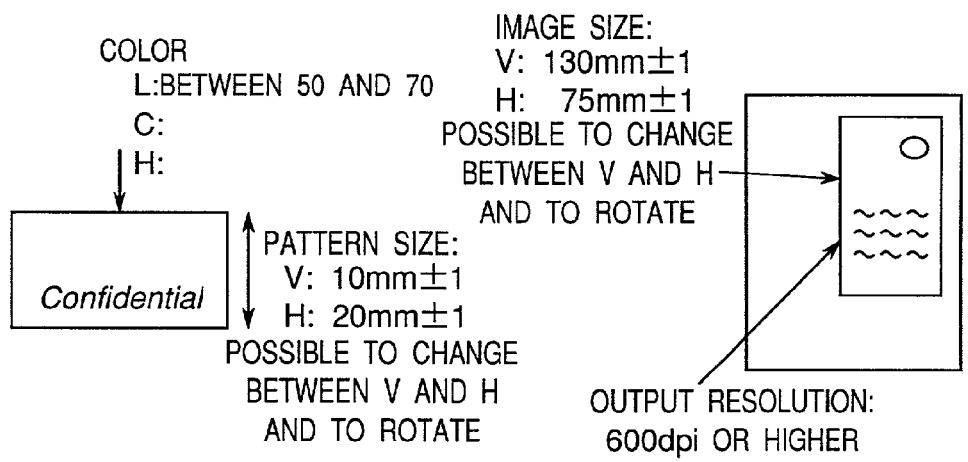
FIG. 2 is a diagram for explaining an example of an output prohibition condition.
Figure 4:
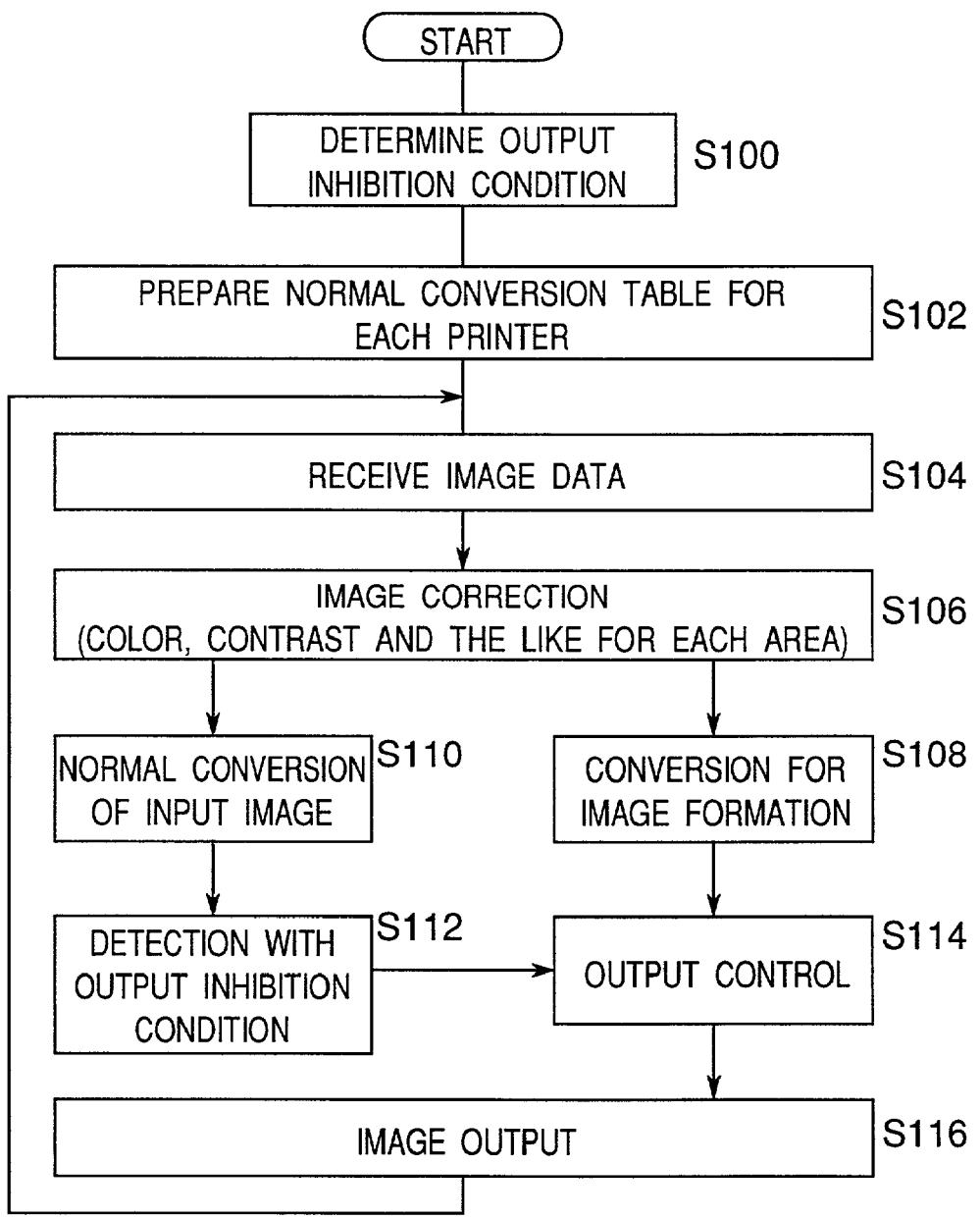
FIG. 4 is a flowchart of image processing in a first embodiment.

FIG. 4 shows a flow of image processing (including the detection of specified pattern) by the computer 10. First, output inhibition conditions are determined (S100) and stored in a memory device in this system. The output inhibition conditions represent conditions used to detect a specified pattern or image included in an image and not to be outputted as a hard copy and they have been determined beforehand. The output inhibition conditions define size and color of the specified pattern, and size, contrast, output resolution of the specified image, and the like. The output inhibition conditions have values which can be defined irrespective of input data type and characteristics of the printer 16, 18. This type of prevention of forgery becomes necessary when a very fine color image is outputted. Therefore, the specified pattern is detected only for a full color image or a high resolution image of 600 dots per inch (dpi) or higher. FIG. 2 shows examples of a specified pattern and a specified image and the output inhibition conditions thereon. As to the specified pattern ("Confidential"), conditions on the size and color thereof are determined, while as to the specified image, conditions on image size and output resolution are determined. As to the size, image subjected to conversion between vertical and horizontal directions or rotation is also an object of the detection.

Figure 3:
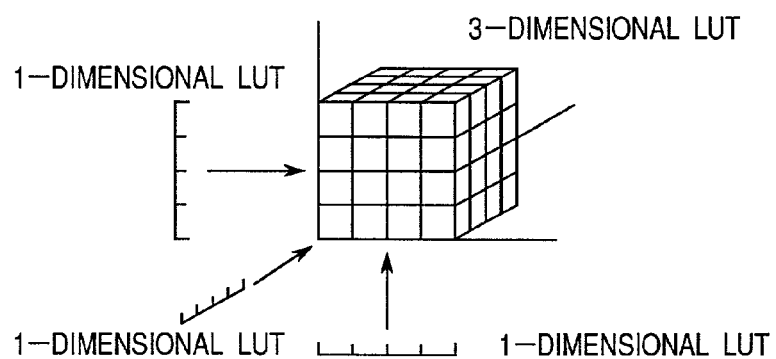
FIG. 3 is a diagram of a composite of lookup tables.

Next, a normal conversion table is generated for each printer 16, 18 (S102). The normal conversion table correlates the input data with a printout or hard copy outputted by the printer, and it is used to calculate an output product based on input data. The format of the normal conversion table is a multi-dimensional look-up table (LUT), a conversion matrix, a mathematical formula or a combination thereof. FIG. 3 shows an example of a combination of one-dimensional and three-dimensional look-up tables. The one-dimensional look-up tables are used for one-dimensional conversion of data.

Next, an example of generation of a normal conversion table is explained. In this example, a three-dimensional look-up table on size, resolution and color of the image (or pattern) is generated. As to the size of image (or pattern), a formula is provided to calculate the size of output image (or pattern) based on the output magnifying power and the size of input image (or pattern) set in a printer driver or the like. The formula may be a simple one as shown below.

$$Lx=(X/P)*N*25.4,$$

wherein Lx denotes size of the output image in the horizontal direction (in the unit of mm), X denotes a number of pixels in the horizontal direction of the image, P denotes resolution of the input image (in the unit of dots per inch), and N denotes output magnifying power. As to the resolution of the image (or pattern), a formula is provided to calculate the resolution of output image (or pattern) based on the output magnifying power and the resolution of input image (or pattern), and print precision set in a printer driver or the like. As to the color of the image (or pattern), an image of a color chart is formed to generate a look-up table. That is, specified image data in the printer or in the printer driver are sent to print the color chart. Then, the obtained print of the chart is determined with a measuring instrument, so that a correspondence between the input image signals and the measurement values on the print or hard copy is determined to generate the look-up table.

The above-mentioned determination of the output inhibition conditions (S100) and the generation of the normal conversion table (S102) are performed at least once for one model of printer. In other words, it is performed for each of the printers 16 and 18. Further, by changing the setting conditions (types of paper and ink, print mode and the like) for each printer, the above-mentioned processing is repeated. Thus, the normal conversion table is generated for each of the printer setting conditions.

Next, data are received from the image input device and are sent to the image output device. The detection of the specified pattern is performed for each image output, in parallel to the normal image output processing. First, an image data is received from the image input device (S104), and image correction is performed on the input image (S106). For example, the image is divided into areas, and color correction, contrast correction or the like is performed on each area. Next, the image data is converted for ordinary image forming (S108). The conversion for ordinary image forming includes, for example, the density conversion of the image data and the conversion to the data on ink colors for cyan (C), magenta (M), yellow (Y) and black (K).

On the other hand, in parallel to the above processing, normal conversion is performed on the input image data after the image correction (S110). By using the formula generated in the generation of the normal conversion table, the size and the resolution of the output image are calculated. (The actual image data maybe enlarged or reduced.) Further, the color of the input image data is converted by using the look-up table. The image data after the conversion is very similar to the resultant color of the print or hard copy.

Next, the specified image is detected according to the output inhibition conditions (S112). It is decided whether the image obtained by the normal conversion of the input image satisfies the output inhibition conditions. A known technique is used for the detection using the output inhibition conditions. As explained above, the detection is performed after converting the input data to data of the color and size of an output image of a print (hard copy). Therefore, a result of the detection in this step is similar to a result when the detection is performed on an actual hard copy. When the image data obtained by the normal conversion of the input image data satisfies the output inhibition conditions, it is decided that the specified pattern is detected.

Next, according to the result of the detection of specified image (S112), it is decided to output the imaged data obtained by the data conversion at step S106 to the image output device or not, and the output control (that is, print stop at the image output device or execution of abnormal printing) is performed (S114). As to the output control, a known technique is used. If the specified image is not detected, the image data subjected to the data conversion is outputted to the image output device (S116), to form the image on a sheet of paper. The steps S100 to S102 may be performed in a system different from this system to determine the output inhibition conditions and the normal conversion tables preliminarily, and the processing at step S104 and the following may be performed by using the results.

Next, a system according to a second embodiment is explained. In this system, the output inhibition conditions which have been set beforehand are converted to detection parameters for input data based on the output characteristics. The output inhibition conditions are set independently of the input device and the output device. Next, an image data is received, and the specified pattern is detected in the image data by using the detection parameters. Then, the permission or inhibition of the output of the input image is decided according to the detection result. Because the detection parameters obtained by converting the output inhibition conditions based on the output characteristics are used, the detection can be performed at a higher speed than the conversion of the entire input image. Further, the detection result according to the output characteristics can be provided. The image processing of the computer 10 in this embodiment is explained below.

Figure 5:
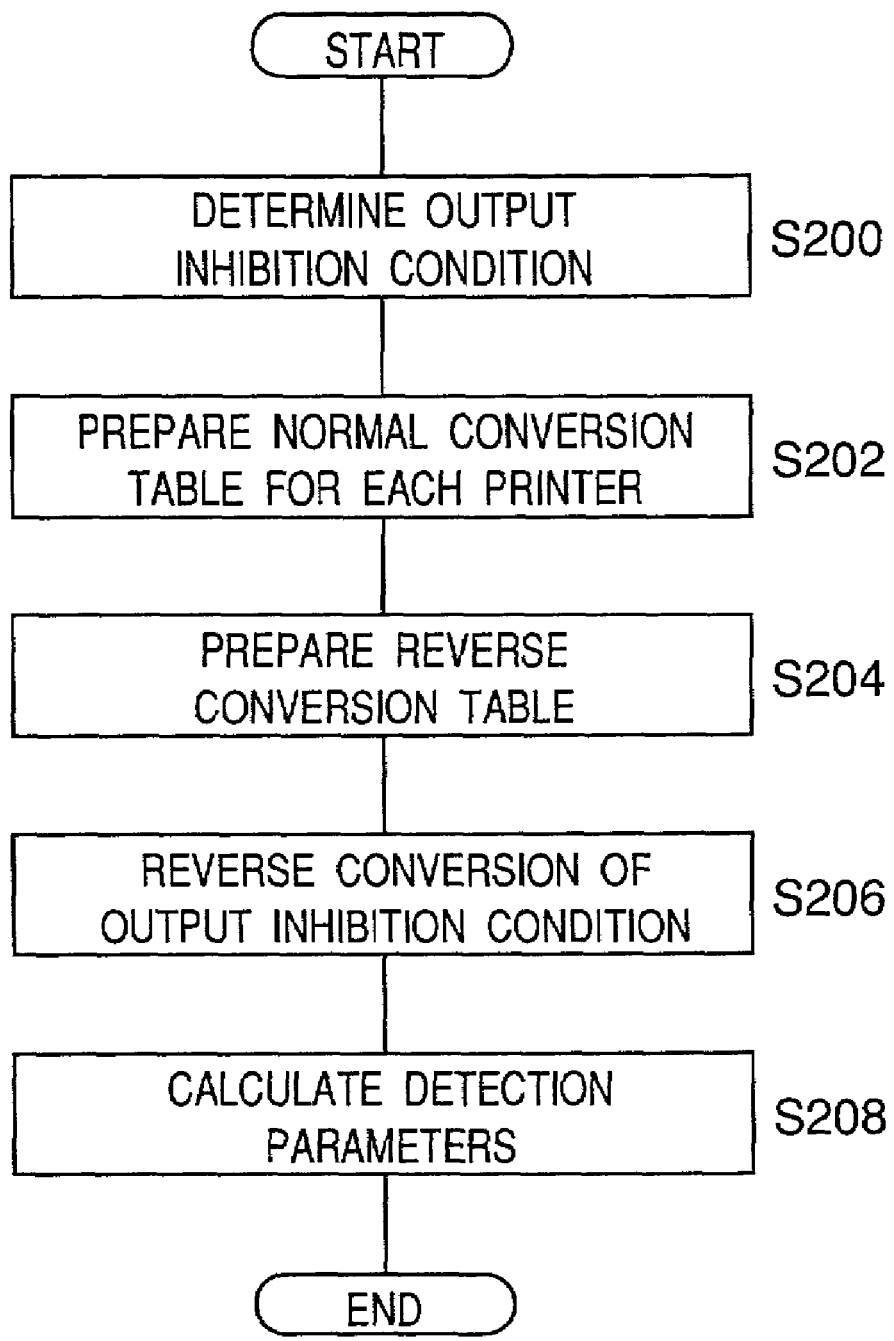
FIG. 5 is a flowchart of setting of detection parameter in a second embodiment

FIG. 5 shows a flow until the calculation of the detection parameters. Determination of the output inhibition conditions (S200) and generation of the normal conversion tables for each printer (S202) are performed similarly to the counterparts in the above-mentioned first embodiment. As to the normal conversion table, a three-dimensional look-up table of the size, resolution and color of image (pattern) are generated, similarly to in the first embodiment. The normal conversion table is generated for each printer. Next, reverse conversion tables are generated by using the normal conversion tables generated at step S202 (S204). The reverse conversion tables are generated as follows. As to the size of the image (or pattern), the formula for the normal conversion is modified, so that a formula is provided to calculate the size of input image (or pattern) based on the magnifying power and the size of output image (or pattern) set in a printer driver or the like. As to the resolution of the image (or pattern), a formula is provided to calculate the resolution of input image (or pattern) based on the magnifying power and the resolution of output image (or pattern), and print precision set in a printer driver or the like. As to the color of the image (or pattern), a look-up table for reverse conversion is generated by using the look-up table for the normal conversion. That is, specified image data in the printer or in the printer driver are sent to produce a print. Then, the obtained print is measured with a measuring instrument, so that a correspondence between the input image signals and the measurement values on the print is determined to generate the look-up table.

Next, reverse conversion of the output inhibition conditions is performed (S206). According to the reverse conversion table prepared at step S204, the numerical values and the like of the output inhibition conditions are converted to data at the image input. As to parameters (for example threshold values of L, C and H in LCH space) such as a range of color which cannot be converted, a plurality of colors which satisfy the parameter are taken out, and they are converted. Next, the detection parameters are calculated (S208). The conditions obtained by the reverse conversion at step S206 may not be favorable for actual detection. Then, calculation is performed further based on the conditions obtained by reverse conversion, to convert detection parameters in a format suitable for the actual detection operations. For example, in the example at step S206, the result of the reverse conversion is a plurality of color coordinates in a color space of the input data. A color area is calculated which includes all the plurality of color coordinates and are represented as parameters convenient for the detection (for example, threshold values of R, G and B in RGB space). As to the size of the image (or pattern), the formula obtained at step S204 maybe used without modification. However, if the type of magnifying power which can be set for output is limited, it may be defined in a one-dimensional look-up table. The detection parameters obtained above are stored in a parameter table.

The above-mentioned determination of the output inhibition conditions (S200) and the generation of the normal conversion table (S202) are performed at least once for one model of printer. In other words, it is performed for each of the printers 16 and 18. Further, by changing the setting conditions (types of paper and ink, print mode and the like)
for each printer, the above-mentioned processing is repeated. Thus, the normal conversion table is generated for each of the printer setting conditions.

Figure 6:
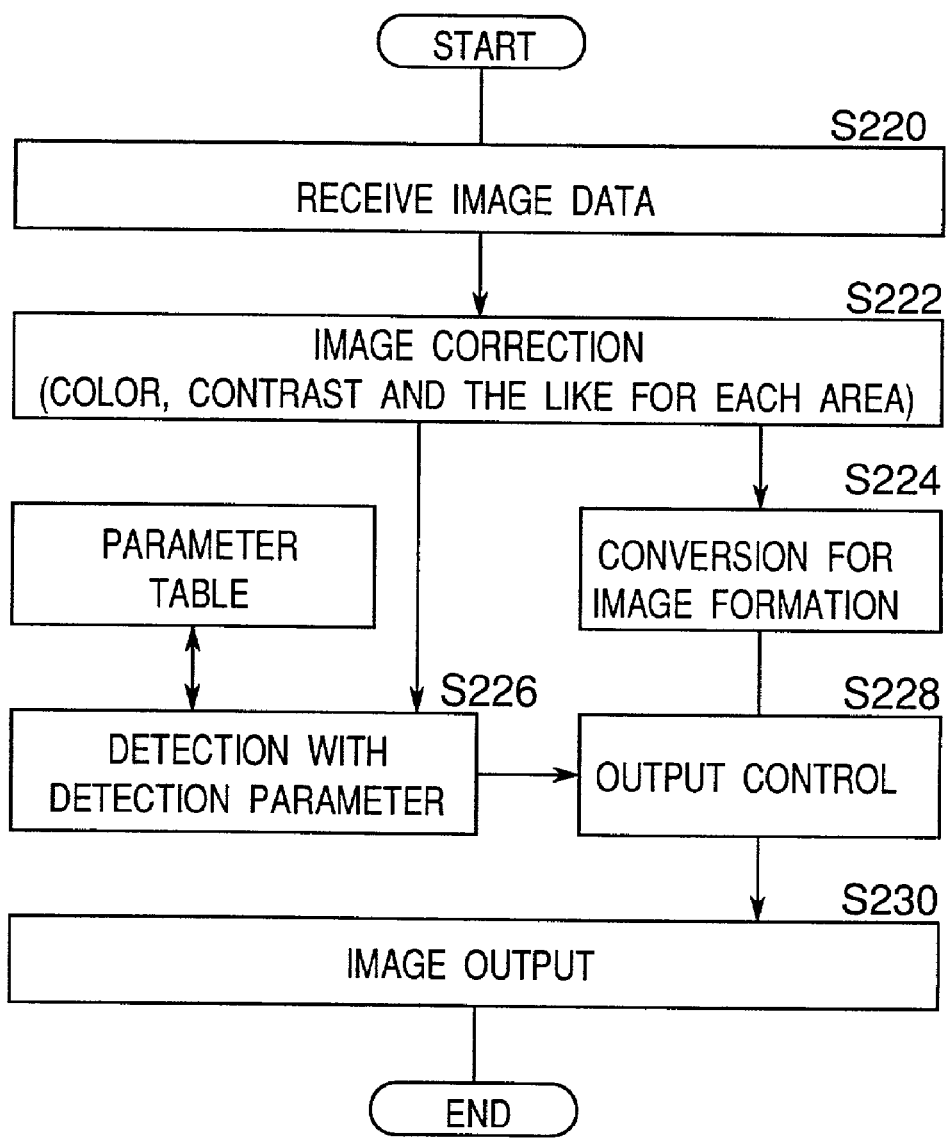
FIG. 6 is a flowchart of image output in a second embodiment.

FIG. 6 shows a flow of image processing in the second embodiment wherein data is received from an image input device and is outputted to an image output device. The detection of a specified pattern is performed for each image output, in parallel to ordinary image output processing. First, an image is received from an image input device (S220), and image correction is performed on the input image (S222). The image is divided into areas, and color correction, contrast correction or the like is performed on each area. Next, data conversion for image forming is performed (S224). This conversion is common to that in the first embodiment. On the other hand, it is detected whether the input image data satisfies the output inhibition conditions, by using the detection parameters in the parameter table (determined in the processing in FIG. 5) (S226). As to the detection process, a known technique is used. Because the specified pattern is detected by using the detection parameters, without performing the normal and reverse conversions of the image, the detection can be performed at a higher speed.

Next, the output is controlled (S228). It is determined according to the result of the detection of the output inhibition conditions whether the image is formed or not (S226), and the output control (print stop or execution of abnormal printing) is performed. A known technique is adopted for the technique for the output control. If the output inhibition conditions are not detected, the image is formed on a sheet of paper (S230).

Next, a system according to a third embodiment is explained. This system is used when a printer such as a printer supporting SRGB is used wherein output color is determined in correspondence to input data. It is a modification of the system of the second embodiment. Practically, in the processing of the second embodiment shown in FIG. 5, the process for generating tables for color is deleted in the generation of normal conversion table at step S202 and in the generation of reverse conversion table at step S204. Further, in the reverse conversion of the output inhibition conditions at step S206, the conversion is performed by using the correspondence of the output color with the input color defined for each printer. For example, in a printer which supports sRGB, output color X, Y and Z is converted with a following formula to input data $R_{sRGB}$, $G_{sRGB}$ and $B_{sRGB}$. The remainder is similar to the counterpart in the system of the second embodiment, and the explanation therefor is omitted here. When normal conversion tables are used, the correspondence between output color and input color may be determined by searching the normal conversion tables, without generating reverse conversion tables.

$$\begin{pmatrix} R_{sRGB} \\ G_{sRGB} \\ B_{sRGB} \end{pmatrix} = \begin{pmatrix} 3.241 & -1.5374 & -0.4986 \\ -0.9692 & 1.876 & 0.0416 \\ 0.0556 & -0.204 & 1.057 \end{pmatrix} \begin{pmatrix} X \\ Y \\ Z \end{pmatrix}$$

Figure 7:
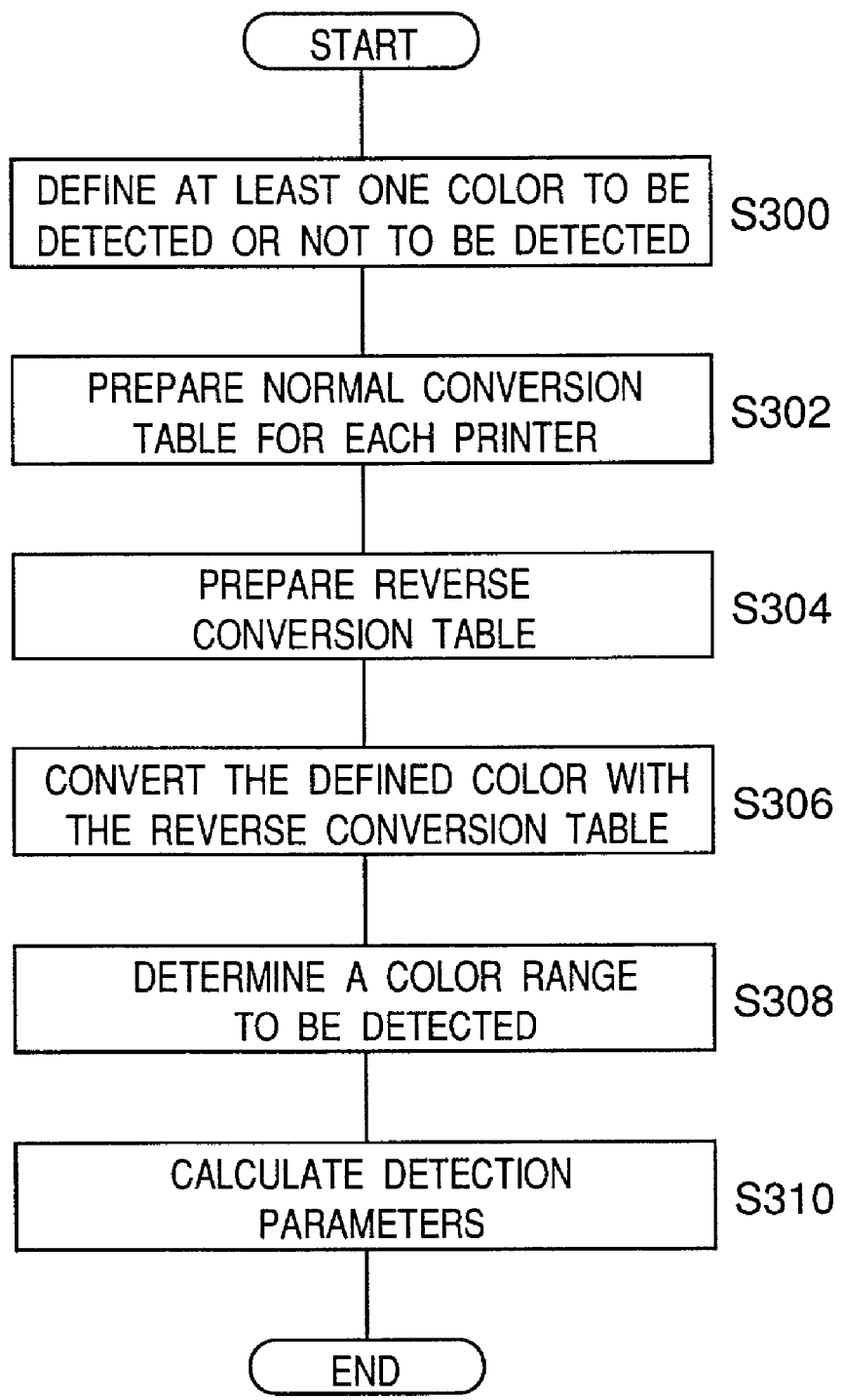
FIG. 7 is a flowchart of processing to calculation of detection parameter in a system of a fourth embodiment.

Next, a system according to a fourth embodiment is explained. This system is also a modification of the system of the second embodiment on the color. FIG. 7 shows processing until the calculation of the detection parameters. First, output inhibition conditions are set (S300), wherein at least one of colors to be detected and not to be detected is defined. The color not to be detected is determined by considering the color of the specified pattern and that of the neighborhood thereof. Thus, it is not needed to determine a specified color range in the output inhibition conditions of color. Next, normal conversion tables for each printer is generated (S302). Then reverse conversion tables for each printer is generated (S304). Next, reverse conversion of the output inhibition conditions is performed (S306), wherein the colors to be detected and not to be detected defined at step S300 are converted by reverse conversion tables. Next, the color range (or a color range including the converted colors to be detected and not including the converted colors not to be detected) to be detected is determined (S308). Next, detection parameters which represent the detection range are set (S310). The image output is performed with use of the detection parameters as in the second embodiment.

In the embodiments explained above, the output inhibition conditions are determined based on printouts or hard copies, independently of input and output systems. Therefore, an image processor or a system which do not depend on the input system can be constructed. Further, because the detection is performed after converting the input image to data of color, size and the like of images after outputting them, a detection result is similar to that on actual print images.

Further, the detection is performed by converting the output inhibition conditions determined with use of the print images to parameters for input data, based on the output characteristics. Therefore, the specified pattern can be detected at higher speed than in the converting of all the image. Further, the detection result in correspondence to the output characteristics can be obtained.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor which processes input image data and sends the processed data to an image output device, comprising:
   a memory device which stores output inhibition conditions for inhibiting print of an image including a specified pattern;
   a first converter which converts the input image data to first image data for image forming;
   a second converter which converts the input image data to second image data in correspondence to characteristics of the image output device;
   a detector which detects the specified pattern in the second image data converted by said second converter, based on the output inhibition conditions stored in said memory device; and
   a controller which controls the output of the first image data converted by said first converter, according to a result of the detection by said detector.

2. The image processor according to claim 1, wherein the output inhibition conditions are independent of the input image data and the image output device.

3. The image processor according to claim 1, wherein said second converter comprises a conversion table based on measurement values of color of the print.

4. An image processing system comprising an image processor which processes input image data and outputs the processed data, and an image output device which receives the processed data and outputs an image, said image processor comprising:
   a memory device which stores output inhibition conditions for inhibiting print of an image including a specified pattern;
   a first converter which converts the input image data to first image data for image forming;
   a second converter which converts the input image data to second image data in correspondence to characteristics of the image output device;
   a detector which detects the specified pattern in the second image data converted by said second converter, based on the output inhibition conditions stored in said memory device; and
   a controller which controls the output of the first image data converted by said first converter, according to a result of the detection by said detector.

5. A method of processing input image data and sending the processed data to an image output device, the method comprising the steps of:
   storing output inhibition conditions for inhibiting output of an image including a specified pattern;
   converting the input image data to first, image data for image forming;
   converting the input image data to second image data in correspondence to characteristics of the image output device;
   detecting the specified pattern in the second image data based on the output inhibition conditions; and
   controlling the output of the first image data according to a result of the detection.

6. A computer-readable storage medium storing a program comprising the steps of:
   storing output inhibition conditions for inhibiting output of an image including a specified pattern;
   converting input image data to first image data for image forming;
   converting the input image data to second image data in correspondence to characteristics of an image output device;
   detecting the specified pattern in the second image data based on the output inhibition conditions; and
   controlling the output of the first image data according to a result of the detection.

7. An image processor which processes input image data and sends the processed data to an image output device, comprising:
   a memory device which stores output inhibition conditions for inhibiting print of an image including a specified pattern;
   a converter which converts the output inhibition conditions to detection parameters according to output characteristics of the image output device;
   a detector which detects the specified pattern in the input image data based on the detection parameters converted by said converter; and
   a controller which controls the output of the processed image data according to a result of the detection by said detector.

8. The image processor according to claim 7, wherein the detection parameters include at least one of color, size and resolution of the print.

9. The image processor according to claim 7, wherein the output inhibition conditions are independent of the input image data and the image output device.

10. The image processor according to claim 7, wherein said converter comprises a conversion table based on measurement values of color of the print.

11. The image processor according to claim 7, wherein the detection parameters are generated for each of setting conditions of the image output device.

12. An image processing system comprising an image processor which processes input image data and outputs the processed data, and an image output device which receives the processed data and outputs an image, said image processor comprising:
   a memory device which stores output inhibition conditions for inhibiting print of an image including a specified pattern;
   a converter which converts the output inhibition conditions to detection parameters according to output characteristics of the image output device;
   a detector which detects the specified pattern in the input image data based on the detection parameters converted by said converter; and
   a controller which controls the output of the processed image data according to a result of the detection by said detector.

13. A method of processing input image data and sending the processed data to an image output device, comprising the steps of:
   storing output inhibition conditions for inhibiting output of an image including a specified pattern;
   converting the output inhibition conditions to detection parameters according to output characteristics of the image output device;
   detecting the specified pattern in the input image data based on the detection parameters; and
   controlling the output of the processed image data according to a result of the detection.

14. A computer-readable storage medium storing a program comprising the steps of:
   storing output inhibition conditions for inhibiting output of an image including a specified pattern;
   converting the output inhibition conditions to detection parameters according to output characteristics of an image output device;
   detecting the specified pattern in input image data based on the detection parameters; and
   controlling the output of an processed image data according to a result of the detection.

* * * * *

UNITED STATES PATENT AND TRADEMARK OFFICE
CERTIFICATE OF CORRECTION

PATENT NO.         : 7,123,369 B2                                              Page 1 of 1
APPLICATION NO. : 09/880044
DATED              : October 17, 2006
INVENTOR(S)        : Naoko Hiramatsu et al.

It is certified that error appears in the above-identified patent and that said Letters Patent is hereby corrected as shown below:

Claim 5, Column 8, Line 24: delete the comma "," after the word "first" (should read: -- . . . first image data . . . --)

Claim 14, Column 10, Line 22: delete "an" (should read: -- . . . the output of processed image . . . --)

Signed and Sealed this

Thirteenth Day of March, 2007

JON W. DUDAS
*Director of the United States Patent and Trademark Office*